US007606773B2

(12) United States Patent
Zhu (10) Patent No.: US 7,606,773 B2
(45) Date of Patent: Oct. 20, 2009

(54) SYSTEM, METHOD AND PRODUCT FOR ROSTERING USING DYNAMIC GENE MODELLING BASED UPON GENETIC ALGORITHMS

(75) Inventor: Chun Bao Zhu, Singapore (SG)

(73) Assignee: Nanyang Polytechnic, Singapore (SG)

( * ) Notice: Subject to any disclaimer, the term of this patent is extended or adjusted under 35 U.S.C. 154(b) by 69 days.

(21) Appl. No.: 11/736,049

(22) Filed: Apr. 17, 2007

(65) Prior Publication Data

US 2007/0192263 A1 Aug. 16, 2007

Related U.S. Application Data

(63) Continuation of application No. 10/501,230, filed as application No. PCT/SG03/00010 on Jan. 20, 2003, now abandoned.

(30) Foreign Application Priority Data

Feb. 27, 2002 (SG) .............................. 200201146-8

(51) Int. Cl.
*G06N 3/12* (2006.01)
(52) U.S. Cl. ...................................................... 706/13
(58) Field of Classification Search .................... 706/13
See application file for complete search history.

(56) References Cited

OTHER PUBLICATIONS

Boyd JC, Savory J. "Genetic algorithm for scheduling of laboratory personnel". Clin Chem. Jan. 2001;47:118-123.*

Edmund Burke, Peter Cowling, Patrick De Causmaecker, Greet Vanden Berghe," A Memetic Approach to the Nurse Rostering Problem", Applied Intelligence, v.15 n.3, p. 199-214, Nov.-Dec. 2001.*

Aickelin U, Dowsland K (2000). "Exploiting problem structure in a genetic algorithm approach to a nurse rostering problem." Journal of Scheduling 3, 139-153.*

Tanomaru J. "Staff Scheduling by a Genetic Algorithm with Heuristic Operators". Proceedings of the IEEE. Reference on Evolutionary Computation 1995; 456-461.*

\* cited by examiner

*Primary Examiner*—David R Vincent
*Assistant Examiner*—Lut Wong
(74) *Attorney, Agent, or Firm*—Lawrence Y D Ho & Associates Pte Ltd (57) ABSTRACT

A genetic algorithms rostering system (20) with a workload and shift setting optimizer (22), a GA rostering engine (24) and a storage medium (26) is described. The GA rostering engine (24) dynamically shifts one or more shift lists of an initial shift list matrix based upon a shifting factor associated with each of the shift lists. Thereafter, the GA rostering engine (24) obtains an intermediate shift list matrix that is then fine-tuned by swapping individual shifts for each of the shift lists in the intermediate shift list matrix. A swapping factor for fine-tuning is associated with each of the shift lists and indicates a gene group with two or more genes. Each of the genes in the gene group is associated with an individual shift. Output of the rostering system (20) are rosters (28) represented in a matrix form.

17 Claims, 7 Drawing Sheets

SYSTEM, METHOD AND PRODUCT FOR ROSTERING USING DYNAMIC GENE MODELLING BASED UPON GENETIC ALGORITHMS

CROSS REFERENCES TO RELATED APPLICATIONS

This is a continuation of U.S. Ser. No. 10/501,230, entitled "System, Method And Product For Rostering Using Genetic Algorithms" filed Jul. 12, 2004 now abandoned, which is a 371 of PCT/SG03/00010 filed Jan. 20, 2003.

FIELD OF THE INVENTION

The present invention relates to systems for rostering to assign personnel of an organization to perform tasks. In particular, this invention relates to a system, method and product for rostering using genetic algorithms.

BACKGROUND OF THE INVENTION

An organization having a large number of personnel with similar or different roles typically require rosters to assign individuals to such roles and for different shifts. These rosters need to be optimized according to constraints associated with the individuals or the roles. Traditionally, rostering is performed manually and this requires one or more persons to determine how various tasks and assignments are allocated to appropriate individuals. Persons involve with rostering require knowledge of parameters such as availability and skill levels of each individual in the organization. However, manual rostering has problems that are impossible or tedious to resolve such as when an individual requests for a change of assignment or cannot perform a task because of sickness or lack of requisite skills.

With developments in electronic computing and software, genetic algorithms provide an improved technique to optimize solutions for tasks that deal with various parameters such as scheduling. In genetic algorithms, each gene typically represents one solution parameter and a chromosome has one or more genes that are encoded to represent the various solution parameters. For example, U.S. Pat. No. 5,848,403 Gabriner et al., assigned to BBN Corporation, describes an improved genetic algorithm scheduling system that creates genomes using cost factors and weight settings to produce initial genomes that encode at least partly optimized schedules.

However, rostering is different from the scheduling system described in U.S. Pat. No. 5,848,403 Gabriner et al. In scheduling, the duration of each task is given and resource and temporal constraints are also known. The main objective of scheduling is to find a start time for every task and, typically at the same time, to allocate proper resources for the task as well. Often, the main objective requires total costs to be minimized.

In rostering, an organization needs round-the-clock coverage of tasks and the objective of rostering is to assign specific individuals to take turns performing a list of duties. Such round-the-clock coverage includes organizations such as, for example, health care facilities, service desks of public utility companies, police and fire departments. Before planning, a roster planner must be given parameters such as a roster period, task and shift specifications. A roster generally defines a work sequence using a shift list on a rotating basis within a group based upon the parameters. Thus, rostering relates to shift distribution as well and this is more than just controlling time for performing tasks as required in scheduling. A roster seeks to balance staff within constraints set by the parameters. In some instances, rostering may have to accommodate other constraints due to individual preferences, capability and availability.

Genetic algorithms are used to obtain optimal rostering solutions based upon the principles of natural evolution, which depends substantially on fitness. In a rostering system based upon genetic algorithms, solution of a problem is encoded in a chromosome. Each unit of the chromosome, known as a gene, is a variable with a defined range of values. Genetic algorithms operate on a population of encoded solutions or chromosomes in a selection-reproduction evolution cycle. The first generation of a selection-reproduction evolution cycle consists of a number of randomly generated chromosomes, which are selected according to a fitness quality. Selected fit members of the first generation are put into a mating pool for reproduction from which a new generation is derived by combining (crossover) or altering (mutating) genes among individuals within the population. The selection-reproduction evolution cycle repeats until an optimal solution is found or after a number of predetermined evolution cycles.

Genetic algorithms are useful in solving many real world problems. However, a preliminary condition that leads to a successful application of genetic algorithms is that solution space of the problem being addressed must be encoded using chromosomes with a manageable length. A chromosome is typically denoted using $C_k$, where k=1 to Z, and Z denotes population size. Each chromosome can have $L_C$ genes such that $C_k=(g_{k,1}; g_{k,2}; g_{k,3}; g_{k,4}; \ldots g_{k,Lc-1}, g_{k,Lc})$ Typically, in modeling genes for existing genetic algorithms systems, a chromosome ($C_k$) represents a solution and a gene ($g_{k,j}$, where j=1 to $L_C$) represents an element of that solution. In this modeling, the element can have X values, each value being statically represented by a value of the gene. For example, in a rostering problem, an element of a roster solution can be a shift with variations according to a time period such as a day shift, a night shift or a non-working shift.

There are numerous ways to arrange shifts in a roster period. Applying static gene modeling using genetic algorithms to roster these shifts may not be feasible when the total number of permutations is huge. Consequently, a gene may have a large number of values that dramatically increase a solution space and significantly slow down evolutionary cycles. One solution to this problem is to use predefined shift patterns to store all shift permutations. However, this is not possible as some shifts cannot be pre-defined and the number of shift permutations can still be huge.

Generally, existing rostering systems using genetic algorithms get more complex when the number of solution parameters increases and this increases the length of chromosomes. Computational complexity further increases when these solution parameters have varying values that further increase the solution space. When chromosomes exceed a manageable length in such existing rostering systems, it becomes unfeasible to provide optimal roster solutions.

Therefore, a need clearly exists for a genetic algorithms rostering system, method and product to search for optimal roster solutions in situations with large solution spaces that require lengthy chromosomes that cannot be managed by existing rostering systems.

SUMMARY OF THE INVENTION

The present invention seeks to provide a genetic algorithms rostering system, a method, and a product comprising computer usable medium having a computer program recorded thereon for processing user input information by the rostering system to derive a roster associated with one or more individuals.

Accordingly, in one aspect, the present invention provides a rostering system based upon genetic algorithms, the rostering system comprising:

at least one storage medium; and a rostering engine, coupled to the at least one storage medium, the rostering engine being adapted to perform genetic algorithm evolution on an initial shift list matrix having one or more shift lists to thereby derive a roster, the genetic algorithm evolution being based upon dynamic adjusting factors, each of the dynamic adjusting factors being respectively associated with each of the shift lists.

In another aspect, the present invention provides, in a rostering system based upon genetic algorithms, a method for processing user input information to derive a roster associated with one or more individuals, the method comprising the steps of:

initializing an initial shift list matrix, the initial shift list matrix having one or more shift lists respectively associated with the one or more individuals; and performing genetic algorithm evolution of the initial shift list matrix based upon dynamic adjusting factors, each of the dynamic adjusting factors being respectively associated with each of the shift lists.

In still another aspect, the present invention provides a product comprising computer usable medium having a computer program recorded thereon for processing user input information to derive a roster associated with one or more individuals, the product comprising:

computer program code means for initializing an initial shift list matrix, the initial shift list matrix having one or more shift lists respectively associated with the one or more individuals; and computer program code means for performing genetic algorithm evolution of the initial shift list matrix based upon dynamic adjusting factors, each of the dynamic adjusting factors being respectively associated with each of the shift lists.

BRIEF DESCRIPTION OF THE DRAWINGS

A preferred embodiment of the present invention shall now be more fully described, by way of example, with reference to the drawings of which.

DETAILED DESCRIPTION OF THE DRAWINGS

A rostering system based upon genetic algorithms, a method, and a product comprising computer usable medium having a computer program recorded thereon for processing user input information by the rostering system to derive a roster associated with one or more individuals, in accordance with a preferred embodiment of the invention, are described.

In the following description, details are provided to describe the preferred embodiment. It shall be apparent to one skilled in the art, however, that the invention may be practiced without such details. Some of these details may not be described at length so as not to obscure the invention.

There are many advantages of the preferred embodiment of the invention. One advantage is that the preferred embodiment applies a novel dynamic gene modeling method using dynamic adjusting factors that enables chromosomes to be reduced significantly in length. These chromosomes are related to shift lists for rostering of individuals. With a significant reduction in length of the chromosomes, it then becomes feasible to use GA evolution to search for optimal or new optimal roster solutions. Consequently, the preferred embodiment enables such chromosomes to be processed unlike static genetic modeling methods in existing rostering systems in which genes are used to represent individual solution parameters.

Another advantage is that rostering in the preferred embodiment balances various shifts at different levels in the hierarchy of an organization according to different requirements of the individuals or the various shifts. Such rostering goes beyond merely scheduling the individuals for the various shifts.

Yet another advantage is that the preferred embodiment optimizes rostering to not only meet hard constraints but to satisfy soft constraints as best as possible. Typically, soft constraints are not sufficiently satisfied in existing rostering systems as accounting for such soft constraints require complex computing hardware and software.

In describing the preferred embodiment, a hospital environment is used as an exemplary organization in which individuals are rostered for a time period according to various shifts in a day and depending upon their skill levels and experience. Such individuals have different requirements, such as annual leave or restrictions of working hours. Furthermore, external factors such as public holidays or sickness of themselves or their colleagues affect rostering of the various shifts. These different requirements and external factors are typical of most organizations. Hence, it is to be noted that the invention is not restricted to the hospital environment as described in the preferred embodiment.

Figure 1:
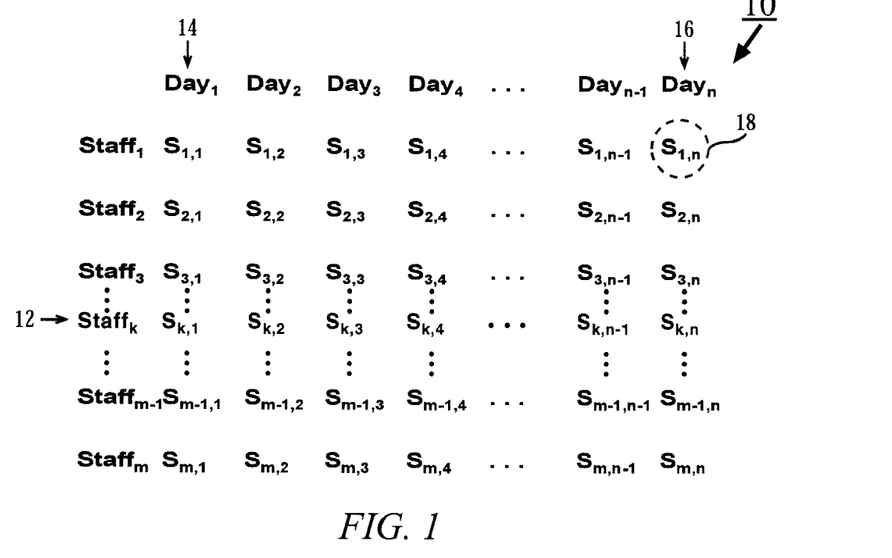
FIG. 1 is an example of a matrix representation of a roster having shift lists for a roster period.

Referring now to FIG. 1, an example of a matrix representation of a roster 10 having a plurality of shift lists for a roster period of n days is shown. A shift list 12 is indicated as a generic example of the plurality of shift lists. The roster period starts from a first day 14 to an $n^{th}$ day 16. Other than days, n can also be of a different time unit depending upon the roster period that is required. Each of the shift lists 12 corresponds to a workload of an individual staff in the roster period. The total number of shift lists in the roster 10 corresponds to the total number of staff, which is represented by 'm'. Each cell 18 in the roster 10 represents a shift that is performed by a staff on a particular day.

This specification refers to terms such as 'workload' and 'shift list'. These terms are clarified below.

A roster is typically derived in two phases. Generally, in a first phase or Phase I, workload and staff assignment is determined. Workload refers to the amount of work to be done by a group of staff. In some instances, workload refers to the number of staff and total number of work shifts required in each team or at each location where round-the-clock coverage services are provided. After the workload has been determined, shift balancing is determined in a second phase or Phase II. The staff assigned to various work sites or locations may be grouped in a multi-layered organizational hierarchy. For example, in the hospital environment, a staff nurse is assigned to an $i^{th}$-team under a $k^{th}$-station in a $j^{th}$-ward, where the $j^{th}$-ward may have several stations, and each $k^{th}$-station may have several teams.

Workload and staff assignment can be very complex and is not easily automated. This is because both technical factors, such as workload balance, and social factors such as government legislation and various staffing constraints have to be taken into account. For example, government legislation may not allow rostering to discriminate between sexes, races or disabilities. As for staffing constraints, the workload and staff assignment should preferably consider human factors such as staff experience and willingness to work in specific groups. Generally, computers have a problem with trying to convert such human factors into rules, especially when the decision-making process is more social or political than technical. Thus, it is desirable and acceptable to manually perform certain tasks such as defining workload, working hours, number of work shifts, organizing team members while leaving complex calculations for deriving an optimal roster to computer processors.

To achieve the optimal roster, the total number of available staff and working shifts should be evenly distributed daily within the roster period at every organizational hierarchical layer. Normally, working shifts in a roster are set on a rotating basis to provide round-the-clock coverage. There are usually two ways to rotate the working shifts, namely, two-rotating shifts (2RS) or three-rotating shifts (3RS). The 2RS consists of a morning shift (D) and an afternoon shift (E) whereas the 3RS consists of a morning shift (D), an afternoon shift (E) and a night shift (N). For a particular rostering problem, each of the shifts has a defined time period, although variations to the defined time period are possible. Here, D, E and N are working shifts, whereas off-days, public holidays and leaves are non-working shifts.

Most organizations that need round-the-clock coverage define shift patterns as base templates over a fixed period of time. For example, a weekly base template for the 2RS may be "D, D, D, E, E, HD, RD" where 'HD' refers to a half day and 'RD' refers to a rest day. An example of a 3RS with a bi-weekly template is "D, D, D, E, E, HD, RD, E, E, N, N, N, HD, RD". These exemplary base templates only define the number of each kind of shifts in the roster period, for example there are 3 Ds and 2 Es in 2RS; although the shifts contained in the template appear in some sort of sequence, the sequence is not important at this stage of workload specification.

Often, a standard base template such as a 2RS or a 3RS that is assigned to a staff has to be changed for different rosters because of leave taking, public holidays, and fixed schedules. Changes in manpower management also affect rostering too. In planning a new roster because of changes requested by a staff, a new shift list that is based on a base template must be constructed and assigned to that staff. In manual rostering, the shift lists are adjusted or re-arrange manually to ensure that staff and shifts are balanced daily during the whole roster period and at every level of organizational hierarchy.

Figure 2:
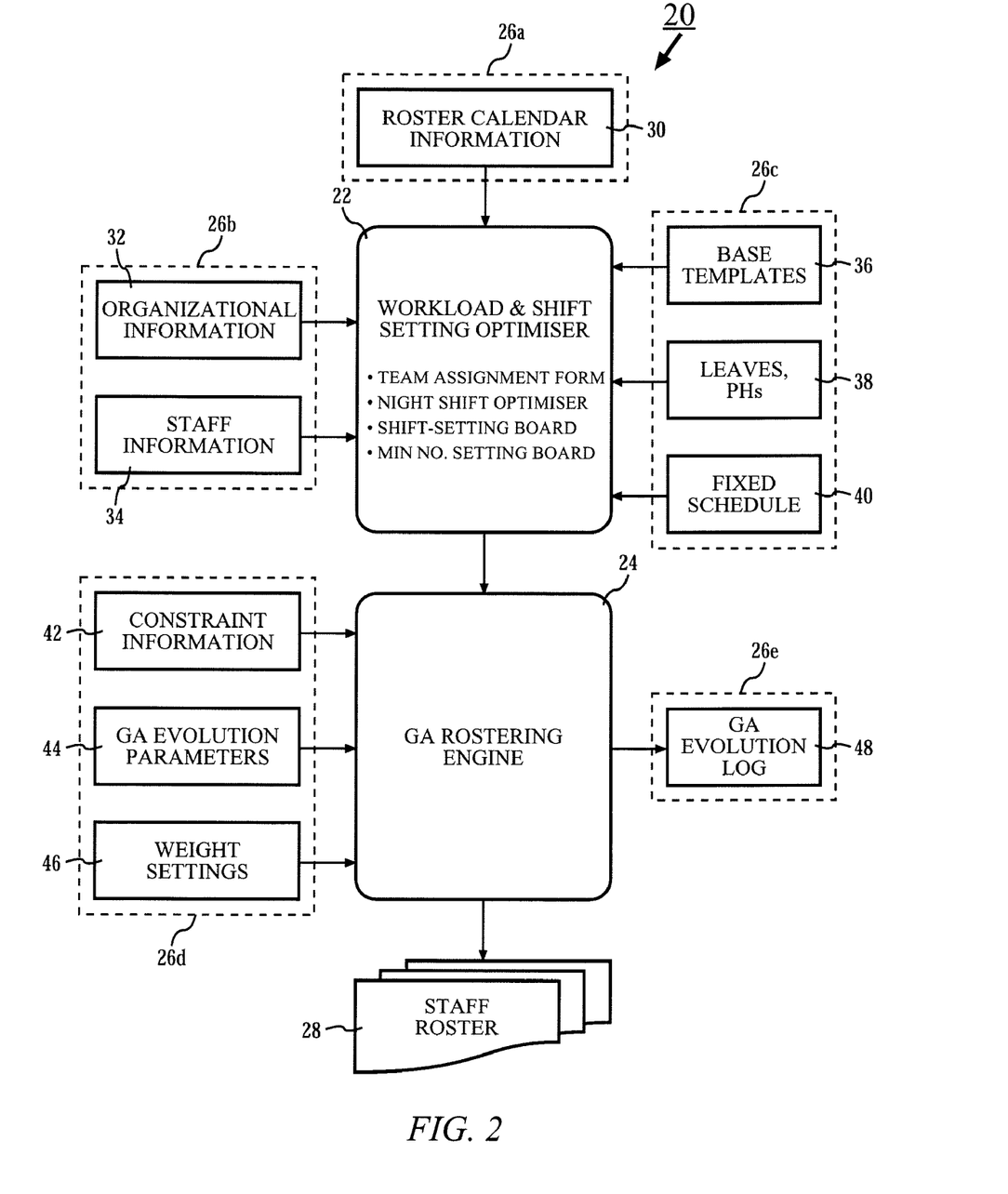
FIG. 2 illustrates a functional block diagram of a rostering system using genetic algorithms in accordance with the present invention.

Referring now to FIG. 2, a functional block diagram of a rostering system 20 using genetic algorithms (GA) in accordance with the preferred embodiment of the present invention is illustrated. The rostering system 20 comprises a workload and shift setting optimizer 22, a GA rostering engine 24 and at least one storage medium 26. Output of the rostering system 20 are rosters 28 as exemplified by the roster 10 of FIG. 1. The workload and shift setting optimizer 22 receives roster calendar information 30 stored in the storage medium 26*a*. The storage medium 26 is indicated separately as different parts 26*a*,26*b*,26*c*,26*d*,26*e* according to data stored therein for illustrative purposes only.

The storage medium 26*b*,26*c* stores multi-layered team organizational information 32, staff information 34, base templates 36, non-working shifts such as staff leaves and public holidays 38, and fixed schedule 40. Fixed schedule 40 refers to certain shift lists that have partially fixed shifts or in which all shifts are fixed. Fixed shift lists, partially or completely, are commonly required for various personal reasons such as when an individual has to work in a particular shift on a particular day. The rostering system 20 does not alter the fixed schedule 40, but fixed working shifts are taken into account when calculating overall shift balance.

The workload and shift setting optimizer 22 optimizes the workload and actual shift loading in terms of overall balance in work force within the roster period. The workload and shift setting optimizer 22 passes balanced workload and shift setting information in the form of a shift list matrix to the GA rostering engine 24.

The GA rostering engine 24 is a GA based artificial intelligence (AI) program that also receives constraint information 42, GA evolution parameters 44 and weight settings 46, stored in the storage medium 26*d*, to evolve rosters 28. The roster 28 generated by the GA rostering engine 24 can be sent for printing or integrated with other database systems.

The constraint information 42 includes legal regulations, organizational rules and personal requirements for leaves. Other constraint information 42 includes personal wishes and staff pairing, most of which are categorized as soft constraints. Some staff may wish to work based upon a preferred shift pattern, for example, D-RD-E pattern and weekend DE pattern. This D-RD-E constraint states that it is desirable to take a morning shift before rest day (RD) and an afternoon shift after the rest day. The weekend DE constraints states that if a person has to be on duty during a weekend day (Saturday and Sunday), it is better to arrange a D shift on Saturday and an E shift on Sunday. Another constraint example is when a senior staff has to supervise a junior staff. Hence, in this constraint example, both the senior staff and the junior staff must be paired in the same working shifts for the whole roster period.

The rostering system 20 arranges constraints, both hard and soft constraints, based on a constraint's precedence according to their weight settings 46. Most of the hard constraints such as number of work hours, number of D, E and N shifts in the roster period would have been satisfied when an initial shift list is provided. The GA rostering engine 24 then evaluates additional constraints that were not considered previously.

The GA evolution parameters 44 comprise crossover rates, mutation rates and default calculated population size. However, for a given rostering problem these GA evolution parameters 44 may be adjusted for better solutions by comparing evolution results stored in a GA evolution log 48 associated with the storage medium 26e.

The rostering system 20 automatically calculates the length of the chromosome, $L_C$, based on the total number of staff $N_S$, shift lists assignment and fixed schedule information as follows: $L_C=N_S-(N_{AF}+N_{PF})$, where, $N_{AF}$, is the number of staff, all of whose shifts are fixed; while $N_{PF}$, is the number of staff, whose shifts are partially fixed and in which adjustments to remaining unfixed shifts do not improve shift balance.

It is possible that during evolution, a genetic algorithm becomes stagnant and unable to produce more fit individuals even though an optimum fitness has not been attained. This is largely because the initial population of the individuals is randomly generated. When this situation occurs, the rostering system 20 sets an extinction operator ($N_{EXTINCT}$) to terminate the evolution. The extinction operator is like a biological extinction of a population that kills all but the most fit individuals. The population is then refreshed with mutated copies of such most fit individuals. The rostering system 20 allows a user to specify a number of generations after which extinction occurs if there is no improvement in fitness after that number of generations.

As there are a large number of rostering factors to be considered in determining an optimal roster solution, and such rostering factors may not equally affect searching for the optimal roster solution, there is a need to set a weight factor for each of the rostering factors. The weight factor ranges from 0 (least important) to 1 (most important). The GA rostering engine 24 receives the weight settings 46 as follows:

- $(W_{OL})_h$—Organizational layer balance factor, h=1 to $N_{OHL}$, where $N_{OHL}$ is the number of organizational layers considered.
- $(W_{GR})_g$—Staff grade group balance factor, g=1 to $N_{GR}$, where $N_{GR}$ is the number of staff grade groups considered.
- $(W_{SHIFT})_s$—Working shift type balance factor, s=1 to $N_{STypes}$, where $N_{STypes}$ is the number of shift types considered, normally only working shifts (D, E and N) are considered.
- $(W_C)_k$—Constraint satisfaction factor, k=1 to $N_C$, where $N_C$ is the number of constraint types considered.

The weight settings 46 are normally predetermined based on collection of domain knowledge but can be adjusted to suit specific rostering problems.

A roster calendar is automatically created in a year by a roster calendar generator based upon the roster period. The rostering system 20 assigns a roster identification (ID) that is unique to each roster period. The roster period is pre-defined because the length of a shift list 12 depends on the roster period. The roster calendar information 30 includes a list of public holidays (PH), which is essentially important in handling PH returns.

The GA rostering engine 24 is adapted to perform genetic algorithm evolution on an initial shift list matrix having one or more shift lists to thereby derive a roster 28. The genetic algorithm evolution is based upon dynamic adjusting factors where each of the dynamic adjusting factors is respectively associated with each of the shift lists.

Figure 3:
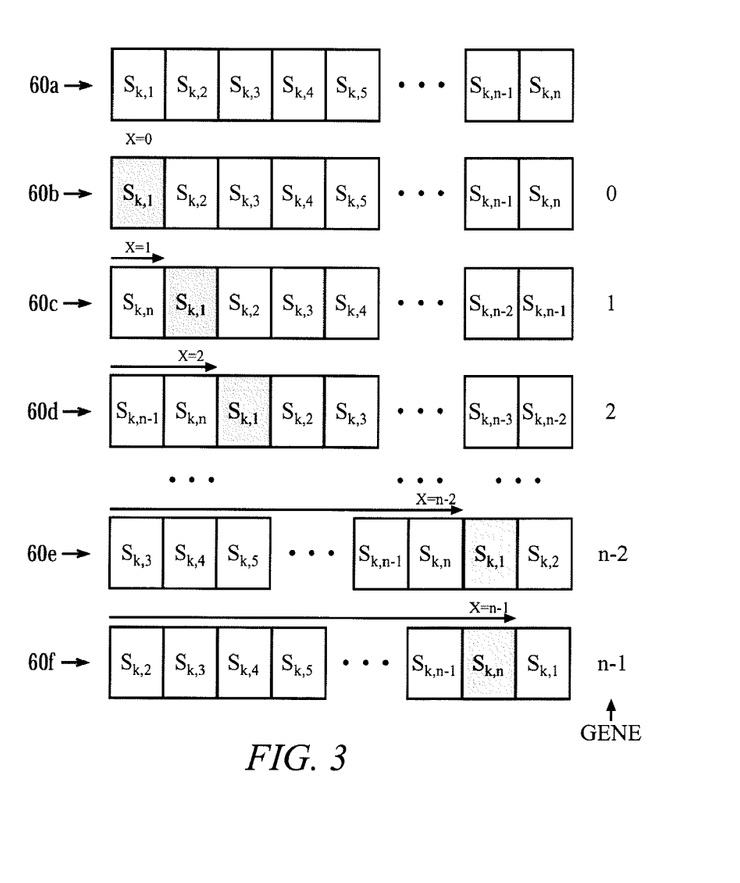
FIG. 3 illustrates dynamic shifting of a shift list by the rostering system of FIG. 2 based upon different dynamic shifting factors.

The dynamic adjusting factors comprise a shifting factor and a swapping factor. FIG. 3 illustrates dynamic shifting of a shift list 12 by the Fostering system 20 for different values (X) of the shifting factor. An unshifted shift list 12 is shown as a reference 60a for the dynamic shifting. In 60b, the shifting factor has a value of zero (X=0) and no shifting occurs. In 60c,60d,60e,60f, the shifting factor has values of one (X=1), two (X=2), n−2 and n−1, respectively.

Figure 4:
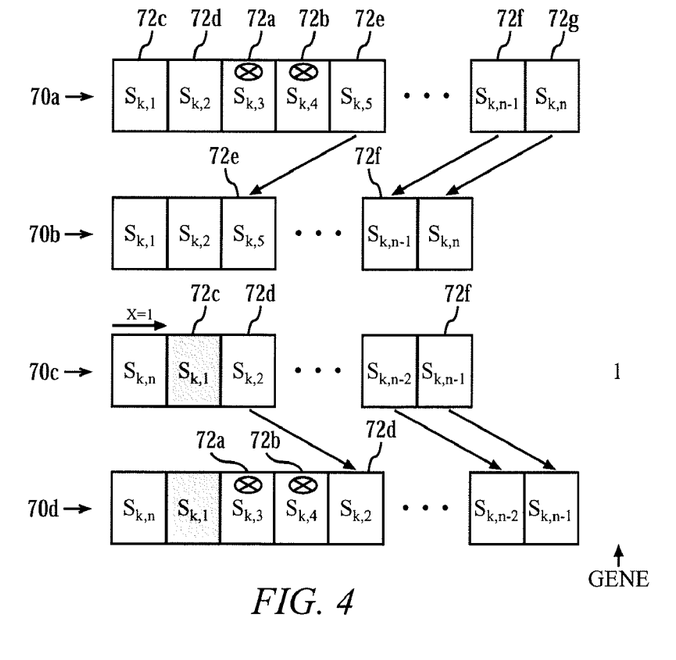
FIG. 4 illustrates dynamic shifting of a shift list with partial fixed schedule by the rostering system of FIG. 2.

FIG. 4 illustrates dynamic shifting of a shift list 12 with fixed shifts by the rostering system 20. An unshifted shift list 12 is shown as a reference 70a and has two fixed shifts 72a,72b within the roster period. The dynamic shifting of the reference 70a is shown sequentially in FIG. 4. An intermediate shift list 70b is formed by removing the two fixed shifts 72a,72b for storage. Thereafter, the dynamic shifting occurs for all unfixed shifts such as 72c,72d,72e,72f,72g as shown in 70c for a shifting factor with a value of one (X=1). Upon completing the dynamic shifting, the two fixed shifts 72a,72b are inserted back into the shift list 12 as shown in 70d in their respective original positions as in the reference 70a.

Figure 5:
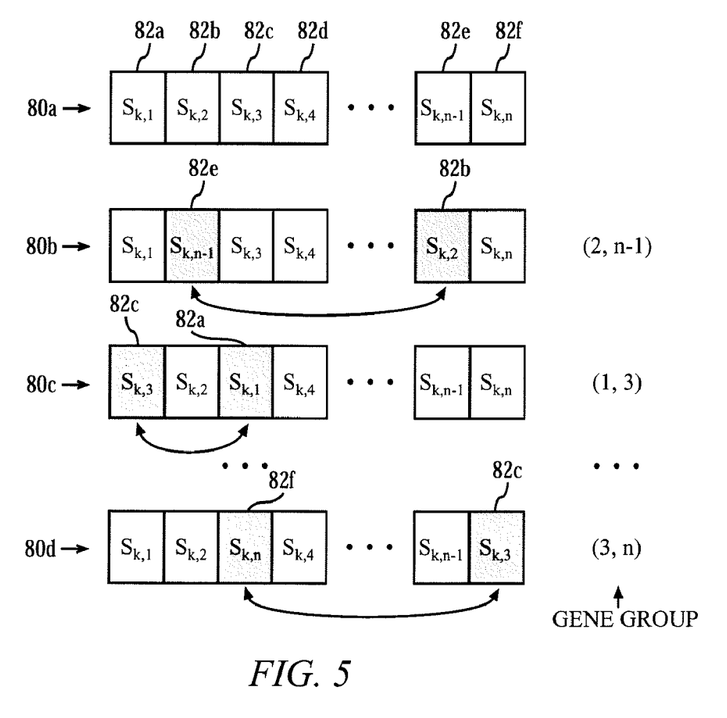
FIG. 5 illustrates swapping of two individual shifts in a shift list of an individual by the rostering system of FIG. 2 based upon different dynamic swapping factors.

FIG. 5 illustrates swapping of two individual shifts in a shift list 12 of an individual by the rostering system 30 based upon the swapping factor. An unswapped shift list 12 is shown as a reference 80a. In 80b, two individual shifts at positions 82b,82e are swapped within the roster period. These positions are indicated by a gene group (2,n−1). In 80c, two individual shifts at positions 82a,82c, indicated by a gene group (1,3), are swapped within the roster period. In 80d, two individual shifts at positions 82c,82f, indicated by a gene group (3,n), are swapped within the roster period.

Figure 6:
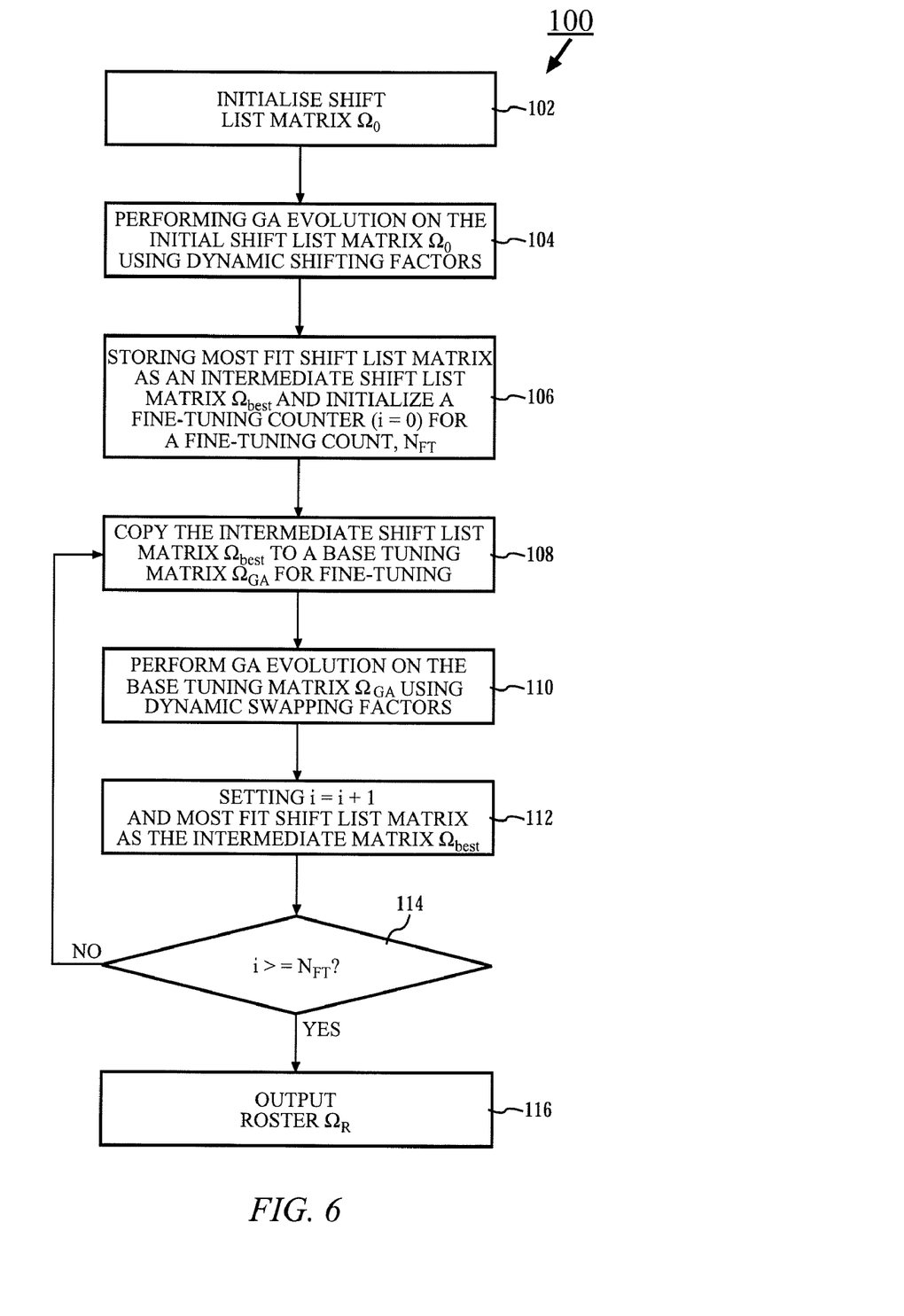
FIG. 6 is a flowchart of a method for deriving a roster using the rostering system of FIG. 2.

Referring now to FIG. 6, a flowchart of a method 100 for deriving the roster 28 using the rostering system 20 is illustrated. The method 100 starts at step 102 at which the GA rostering engine 24 receives an initial shift list matrix $\Omega_0$. The GA rostering engine 24 then performs genetic algorithm evolution of the initial shift list matrix $\Omega_0$ in step 104 based upon the shifting factor. At least one evolutionary cycle is performed in this GA evolution step 104 to dynamically shift the shift lists of the initial shift list matrix $\Omega_0$.

The most fit shift list matrix resulting from the GA evolution step 104 is then stored as an intermediate shift list matrix $\Omega_{best}$ in the storage medium 26 at step 106. The GA rostering engine 24 also initializes a fine-tuning counter to zero (i=0) for a fine-tuning count $N_{FT}$ at step 106. The fine-tuning count $N_{FT}$ is predetermined by a user and can be any arbitrary number depending on requirements of the rostering system 20.

The method 100 continues at step 108 at which the intermediate shift list matrix $\Omega_{best}$ is copied to a base tuning matrix $\Omega_{GA}$ for fine-tuning. In performing GA evolution in the fine-tuning at step 110, individual shifts identified by the swapping factor are swapped for each of the shift lists. Specifically, the swapping factor provides a gene group that has two or more genes in which each of the genes is associated with an individual shift within each of the shift lists. It is to be noted that the rostering system 20 validates genes in the gene group to ensure that illegal swapping does not occur such as, for example, swapping of fixed shifts.

After the fine-tuning step 110, the GA rostering engine 24 calculates fitness values for all shift list matrices in each generation and selects fit shift list matrices to construct a mating pool at step 112. The fine-tuning counter is also increased by one (i=i+1) and the most fit shift list matrix is set to be the intermediate shift list matrix $\Omega_{best}$. The GA rostering engine 24 then determines at decision step 114 whether to stop the fine-tuning step 110. For a 'No', the method 100 returns to step 108 to repeat the steps 108,110,112 for the intermediate shift list matrix $\Omega_{best}$. Otherwise, with a 'Yes', the method proceeds to provide the roster 28 at step 116. The roster 28 is provided as a shift list matrix as shown in FIG. 1.

Figure 7:
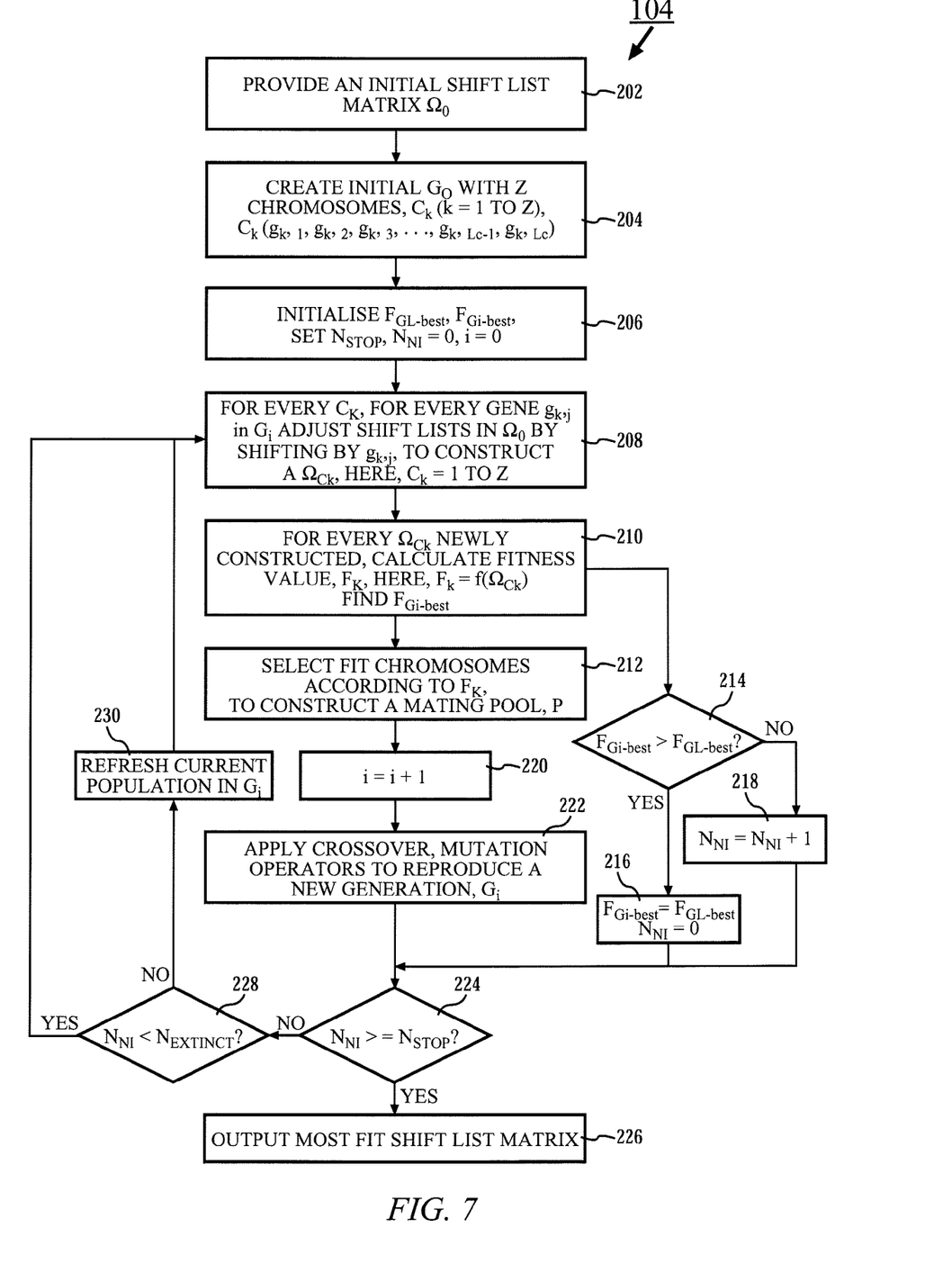
FIG. 7 is a flowchart illustrating details of dynamically shifting by the rostering system of FIG. 2.

FIG. 7 is a flowchart illustrating details of the GA evolution step 104 in the method 100. At step 202, the GA rostering engine 24 reads the initial shift list matrix $\Omega_0$, obtains the GA evolution parameters 44 and determines the length of the chromosomes, $L_C$. At this point, the GA rostering engine 24 also receives all necessary input like the constraints information 42 as well.

Thereafter, the GA rostering engine 24 creates an initial generation $G_0$ by randomly generating Z chromosomes at step 204. Each of the Z chromosomes, $C_k$, consists of Lc genes, (k=1 to Z). In other words, $$C_k = (g_{k,1}, g_{k,2}, g_{k,3}, \ldots, g_{k,Lc-1}, g_{k,Lc})$$

The GA rostering engine 24 then initializes a global best fitness variable, $F_{GL\text{-}best}$, and a best fitness variable for the $i^{th}$ generation, $F_{Gi\text{-}best}$ at step 206. In addition, the GA rostering engine 24 sets $N_{STOP}$, which is the number of generations after which the overall best fitness remains unchanged. In the preferred embodiment, $N_{STOP}$ is set for a value between thirty and fifty. However, other ranges of values may also be set. Both $N_{NI}$ and i are set to zero, where $N_{NI}$ is a variable that represents the number of generations evolved without any overall fitness improvement.

Unlike existing rostering systems, the chromosome $C_k$ in the present invention does not represent a solution but indicates how each of the shift list 12 of the initial shift list matrix $\Omega_0$ is dynamically shifted. Accordingly, Z shift list matrices $\Omega_{Ck}$ are dynamically created at step 208 for a current generation. That is, for every chromosome $C_k$, for every gene $g_{k,j}$ in $C_k$, where j=1 to Lc, the shift lists in the initial shift list matrix $\Omega_0$ are dynamically adjusted by shifting to the right by $g_{k,j}$ positions. This shifting step 208 results in the Z shift list matrices $\Omega_{Ck}$, where Ck=1 to Z.

The GA rostering engine 24 then evaluates each of the Z shift list matrices $\Omega_{Ck}$ by calculating a fitness value $F_k$, where $F_k = f(\Omega_{Ck})$, k=1 to Z at step 210. The lower the fitness value, the better a shift list matrix $\Omega_{Ck}$ is overall balanced. An overall fitness function $f(\Omega_{Ck})$ is defined as follows:

$$F_k = F_{OHb} + F_{GENDERb} + F_{FLb} + F_{OP} + F_{WP}$$

In the above overall fitness function $f(\Omega_{Ck})$, $F_{OHb}$ is the fitness variable that indicates how well the shifts in a shift list matrix $\Omega_{Ck}$ are balanced at various layers in an organization. $F_{GENDERb}$ indicates how well male staff and female staff are balanced, $F_{FLb}$ indicates how foreign and local staff are balanced, $F_{OP}$ indicates opposite/same shifts constraint satisfaction and $F_{WP}$ indicates how well staff wishes are satisfied such as a preferred work pattern like D-RD-E pattern and weekend DE pattern.

The standard deviation of working shifts distribution is used to measure how the overall shifts are balanced. The formula below is used to calculate $F_{OHb}$, where $\overline{S}_{h,g,s}$ is the average sum of the shifts which are indexed with h, g and s in a roster period, while $S_{h,g,s,d}$ is the actual number of shifts per day under an indexed group. Here h, g, s and d are indexed of organizational layers (h) grade groups (g), shift types (s) and day (d) respectively. $(W_{SHIFT})_s$, $(W_{GR})_g$, and $(W_{OL})_h$ are weight factors.

$$F_{OHb} = \sum_{h=1}^{N_{OHL}} \left( \sum_{g=1}^{N_{GG}} \left( \sum_{s=1}^{N_{STypes}} \left( \sqrt{\frac{\sum_{d=1}^{n}(\overline{S}_{h,g,s} - S_{h,g,s,d})^2}{n}} \right) \times (W_{SHIFT})_s \right) \times (W_{GR})_g \right) \times (W_{OL})_h$$

$F_{GENDERb}$ and $F_{FLb}$ can also be calculated using other similar formulae in which staff are grouped not according to organizational layers but gender and local/foreign categories, respectively. $F_{OP}$ and $F_{WP}$ are calculated by examining how well shift arrangements, for each shift list in the new shift list matrix $\Omega_{Ck}$, match given preferred patterns.

Selecting fit chromosomes according to $F_k$ occurs at step 212. Such fit chromosomes are used to construct a mating pool. There must be a best fitness value $F_{Gi\text{-}best}$ in each generation $G_i$. If $F_{Gi\text{-}best}$ is better than $F_{GL\text{-}best}$, at decision step 214, then the GA rostering engine 24 updates $F_{GL\text{-}best}$ by assigning $F_{Gi\text{-}best}$ as $F_{GL\text{-}best}$ at step 216 and setting $N_{NI}=0$. Otherwise if $F_{Gi\text{-}best}$ shows no improvement, then $N_{NI}$ is incremented by one at step 218. In any case, the number of evolutions (i) is incremented at step 220. From the mating pool, the GA rostering engine 24 reproduces a new generation, $G_i$, at step 222 by applying crossover and mutation operators. At the reproducing step 222, the most-fit individuals in a current generation are copied directly to the new generation, $G_i$.

The GA rostering engine 24 may stop the GA evolution if the overall fitness has no improvement after $N_{STOP}$ generations, e.g., $N_{NI} \geq N_{STOP}$ at decision step 224. Thereafter, with a 'Yes', the GA rostering engine 24 outputs the most fit shift list matrix at step 226. Otherwise, with a 'No', the GA rostering engine 24 checks at decision step 228 whether there is a need to use the extinction operator, $N_{EXTINCT}$. This decision step 228 requires checking whether $N_{NI}$ is less than $N_{EXTINCT}$.

With a 'No' following the decision step 228, the GA rostering engine 24 refreshes a current population in $G_i$ at step 230 and returns to step 208. Otherwise, with a 'Yes' following the decision step 228, the GA evolution goes directly to step 208.

Although FIG. 7 illustrates how process and data flow during the GA evolution step 104, the flowchart can also be used to explain the GA evolution of the fine-tuning step 110. The difference between the GA evolution step 104 and the fine-tuning step 110 is that the shift lists in the shift list matrix $\Omega_{GA}$ for the fine-tuning step 110 are dynamically adjusted by swapping selected shifts rather than shifting the whole shift list as in the GA evolution step 104. Therefore, in the fine-tuning step 110, a $C_k$, consists of list of gene groups, $Cf_k = (gp_{k,1}, gp_{k,2}, gp_{k,3}, \ldots, gp_{k,Lc-1}, gp_{k,Lc})$, rather than individual genes. Unlike the GA evolution step 104 in which the shift lists in the shift list matrix $\Omega_{GA}$ is performed once only, the roster 28 may be fine-tuned several times at the fine-tuning step 110 until an acceptable overall balance level is achieved.

Figure 8:
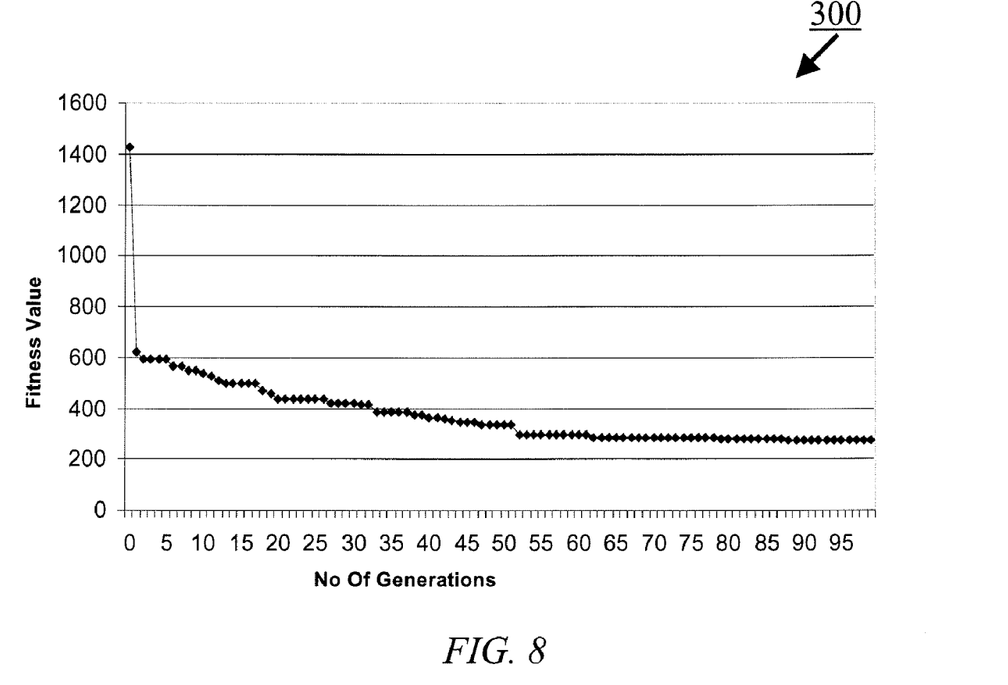
FIG. 8 is a graph showing fitness improvements of the roster during dynamic shifting in the method of FIG. 6.
Figure 9:
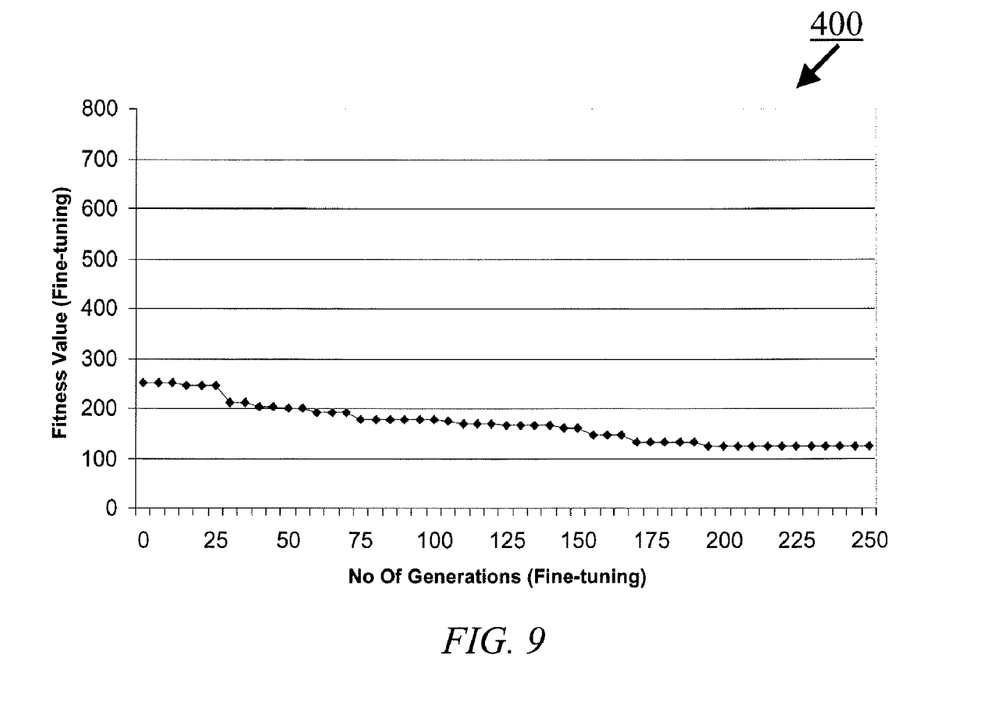
FIG. 9 is a graph showing fitness improvements of the roster during swapping in the method of FIG. 6.

FIG. 8 is a graph showing fitness improvements of the roster 28 during the GA evolution step 104 of dynamic shifting in the method 100. FIG. 9 is a graph showing fitness improvements of the roster 28 during the fine-tuning step 110 of swapping in the method 100.

Figure 10:
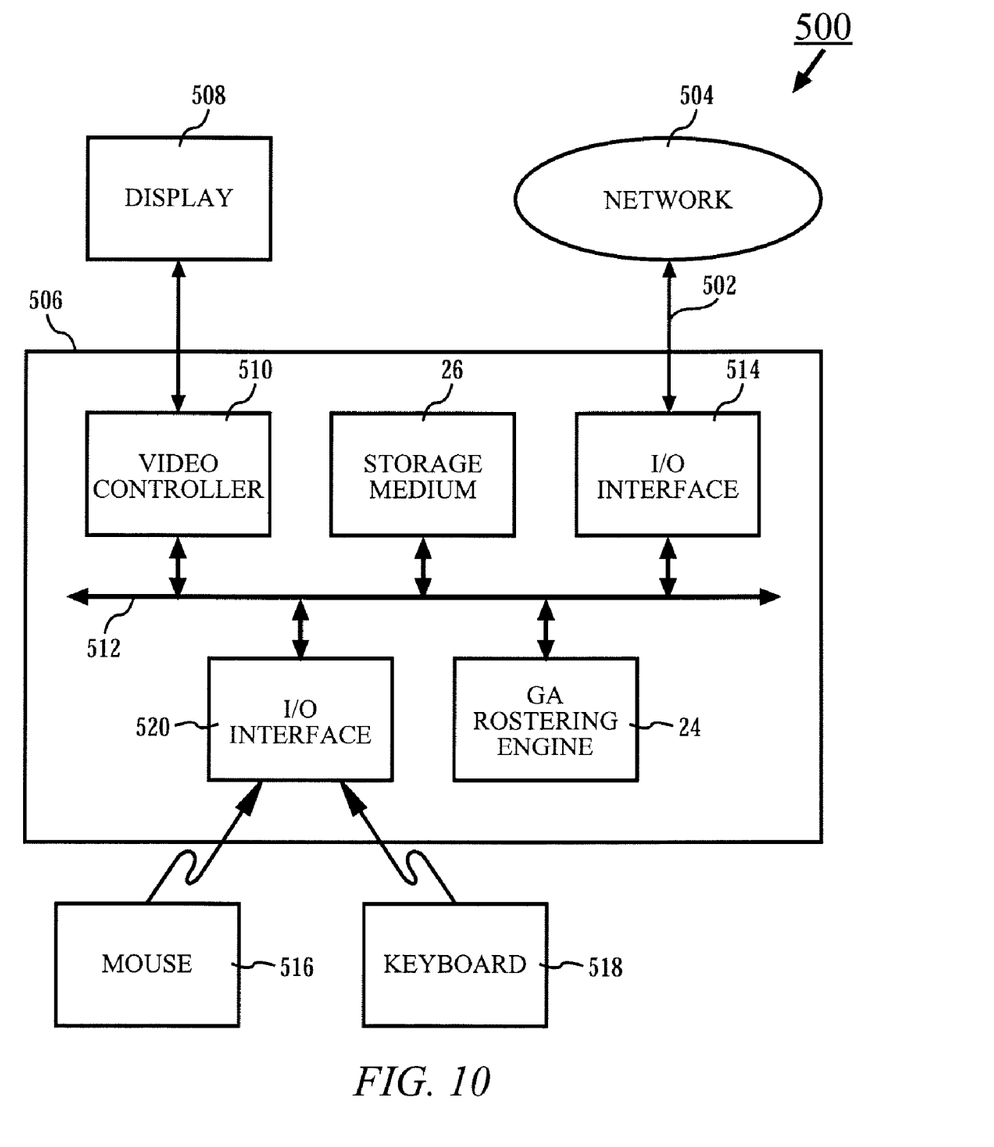
FIG. 10 is an example of a computer system for executing the steps of the method of FIG. 6 when stored in a product.

The steps of the method 100 can be executed via a computer program that is recorded on computer usable medium. Such computer usable medium may include random access memories (RAMs), read-only memories (ROMs), hard disks, and the different types of compact discs or floppy disks. A product that comprises the computer program recorded on computer usable medium can be executed with, for example, a computer system 500 as illustrated in FIG. 10.

The computer system 500 can be, for example, a server when the rostering system 20 is implemented as a client-server system with different access rights for different users. As a server, the computer system 500 can be coupled via a communication resource 502 to a network 504 such as, for example, an Intranet or the Internet. The computer system 500 comprises a computer 506 that includes the storage medium 26 and the GA rostering engine 24. Typically, the computer 506 has, for example, an intelligent data processor that supports the functions of the GA rostering engine 24. The storage medium 26 can serve as the computer usable medium with the computer program recorded thereon. In this case, the storage medium 26 can be one or more memory devices such as random access memories (RAMs), read-only memories (ROMs), or hard disks. Alternatively, the storage medium 26 can be a memory device reader such as, for example, a compact disc drive or a floppy disk drive. Such a memory device reader enables access to the computer program by the GA rostering engine 24.

The display 508 is coupled to the GA rostering engine 24 via a video controller 510. Data flow within the computer 502 is by means of a data bus 512 that couples the video controller 510, the storage medium 26, the GA rostering engine 24 and an input/output (I/O) interface 514. A user input means, comprising a mouse 516 and a keyboard 518, couples to the data bus 512 via another I/O interface 520.

The present invention therefore provides the rostering system 20, the method 100, and the product that comprises the computer program for executing the steps of the method 100 by the rostering system 20 to overcome, or at least alleviate, the problems of the prior art.

It will be appreciated that although one preferred embodiment has been described in detail, various modifications and improvements can be made by a person skilled in the art without departing from the scope of the present invention.

The invention claimed is:

1. A dynamic gene modeling rostering computing system based upon genetic algorithms, said dynamic gene modeling rostering computing system comprising:
   at least one computer readable storage medium within which embedded a dynamic gene modeling computer program for performing rostering; wherein the dynamic gene modeling computer program comprises:
      a workload and shift setting optimizer configured to construct an initial shift list matrix, wherein the shift list matrix has m rows and n columns, wherein m and n are integral numbers, and wherein when there are a plurality of staff and a plurality of shifts during a rostering period, m represents the plurality of staff, n represents the plurality of shifts;
   and
   a roster engine configured to
      construct an initial generation of chromosomes by dynamic gene modeling, wherein the length of each chromosome is automatically calculated based on total number of staff, shift lists assignment and fixed schedule information, and each of the shift lists is associated with a dynamic adjusting factors, and
      perform genetic algorithm evolutions on the initial generation of chromosomes based on the dynamic adjusting factors and then to manipulate said initial shift list matrix according to the evolved dynamic adjusting factors to firstly derive a roster and then further fine-tune the roster to provide an optimal roster; wherein the optimal roster is achieved when the total number of available staff and work shifts are evenly distributed daily within the roster period at every organizational hierarchical level;
   whereby the optimal roster is output to a user.

2. The dynamic gene modeling rostering computing system of claim 1, wherein said dynamic adjusting factors comprises a shifting factor; wherein the shifting factor does not directly represents roster solution element but dynamically represents how the shifting position from which shifting operation is performed by GA evolution on said initial shift.

3. The dynamic gene modeling rostering computing system of claim 2, wherein said rostering engine performs said genetic algorithm evolution on said initial shift lists to derive a roster by dynamically shifting said shift lists in at least one evolutionary cycle based upon said shifting factors.

4. The dynamic gene modeling rostering computing system of claim 2, wherein said dynamic adjusting factors further comprises a swapping factor; wherein said swapping factor does not directly represents roster solution element but dynamically represents how shifts in said shift lists are swapped from which swapping operation is performed by GA evolution on said shift lists; thereby fine-tuning the roster generated in previous GA evolution.

5. The dynamic gene modeling rostering computing system of claim 4, wherein said swapping factor comprises a gene group having two genes, each of said gene being associated with a swapping position within each of said shift lists, and two genes in said gene group determine two swapping positions in the associated shift list, two shifts located at said two swapping positions are to be swapped in said GA evolution in order to fine-tune the roster generated in prior evolutionary cycles.

6. The dynamic gene modeling rostering computing system of claim 5, wherein said rostering engine performs said genetic algorithm evolution to fine-tune the roster previously searched by using swapping factors to swap individual shifts for each of said shift lists, said GA based fine-tuning evolution can be optionally performed for more than one times until an optimal or near optimal solution is obtained, or a predetermined terminating condition is met, wherein the optimal roster is achieved when the total number of available staff and working shifts are evenly distributed daily within the roster period at every organizational hierarchical layer.

7. The dynamic gene modeling rostering computing system of claim 1, wherein the plurality of shifts include working shifts and non-working shifts.

8. In a dynamic gene modeling rostering computing system based upon genetic algorithms, a method for processing user input information to derive a roster, said method comprising the steps of:
   constructing an initial shift list matrix, wherein the shift list matrix has m rows and n columns, wherein m and n are integral numbers, and wherein when there are a plurality of staff and a plurality of shifts during a rostering period, m represents the plurality of staff, n represents the plurality of shifts;
   constructing an initial generation of chromosomes by dynamic gene modeling, wherein the length of each chromosome is automatically calculated based on total number of staff, shift lists assignment and fixed schedule information, and each of the shift lists is associated with a dynamic adjusting factors, and
   performing genetic algorithm evolutions on the initial generation of chromosomes based on the dynamic adjusting factors and then manipulating of said initial shift list matrix-according to the evolved dynamic adjusting factors to firstly derive a roster and then further fine-tune said roster to provide an optimal roster;
   wherein the optimal rosier is achieved when the total number of available staff and work shifts are evenly distributed daily within the roster period at every organizational hierarchical level;
   whereby the optimal roster is output to a user.

9. The method of claim 8, wherein said genetic algorithm evolution comprises the step of dynamically shifting said initial shift lists to form a plurality of shift list matrices in at least one evolutionary cycle based upon a shifting factor of said dynamic adjusting factors.

10. The method of claim 9, wherein said performing step further comprises the step of calculating fitness value for each of said plurality of shift list matrices; said fitness value is a measurement of shift balance and constraint satisfaction of each of said shift list matrices constructed based upon chromosomes produced in GA evolution.

11. The method of claim 10, wherein said genetic algorithm evolution by dynamically shifting said initial shift lists generates a roster solution which is created by the best chromosome among others at end of the GA evolution cycle according to their fitness evaluation.

12. The method of claim 9, wherein said genetic algorithm evolution further comprises a swapping factor; wherein said swapping factor does not directly represents roster solution element but dynamically represents how shifts in said shift lists are swapped from which swapping operation is performed by GA evolution on said shift lists; thereby fine-tuning the roster generated in previous GA evolution.

13. A product comprising computer storage medium having a genetic algorithm-based dynamic gene modeling computer program recorded thereon for processing user input information to derive a roster, wherein said genetic algorithm-based dynamic gene modeling computer program comprises:
 a workload and shift setting optimizer configured to construct an initial shift list matrix, wherein the shift list matrix has m rows and n columns, wherein m and n are integral numbers, and wherein when there are a plurality of staff and a plurality of shifts during a rostering period, m represents the plurality of staff, n represents the plurality of shifts; and
 a roster engine configured to
  construct an initial generation of chromosomes by dynamic gene modeling, wherein the length of each chromosome is automatically calculated based on total number of staff, shift lists assignment and fixed schedule information, and each of the shift lists is associated with a dynamic adjusting factors, and
  perform genetic algorithm evolutions on the initial generation of chromosomes based on the dynamic adjusting factors and then to manipulate said initial shift list matrix according to the evolved dynamic adjusting factors to firstly derive a roster and then further fine-tune the roster to provide an optimal roster; wherein the optimal roster is achieved when the total number of available staff and work shifts are evenly distributed daily within the roster period at every organizational hierarchical level:
 whereby the optimal roster is output to a user.

14. The product of claim 13, wherein said genetic algorithm-based dynamic gene modeling computer program further comprises a main roster scheduler program for dynamically shifting said shift lists to form a plurality of shift list matrices in at least one evolutionary cycle based upon a shifting factor of said dynamic adjusting factors.

15. The product of claim 14, wherein said genetic algorithm-based dynamic gene modeling computer program further comprises a fitness function computer program module for calculating fitness value for each of said plurality of shift list matrices.

16. The product of claim 15, wherein said genetic algorithm-based dynamic gene modeling computer program further comprises a computer program for selecting from said plurality of shift list matrices to construct a mating pool based upon said fitness value.

17. The product of claim 13, wherein said genetic algorithm-based dynamic gene modeling computer program further comprises a roster fine-tuning program for swapping between individual shifts identified by a gene group for one or more of said shift lists, said gene group having two or more genes, each of said genes being associated with an individual shift within each of said shift lists, said fine-tuning program improves quality of the roster.

* * * * *